(12) United States Patent
Kaneta

(10) Patent No.: US 7,087,344 B2
(45) Date of Patent: Aug. 8, 2006

(54) BATTERY MODULE

(75) Inventor: Hiroshi Kaneta, Tokyo (JP)

(73) Assignee: NEC Corporation, Tokyo (JP)

( * ) Notice: Subject to any disclaimer, the term of this patent is extended or adjusted under 35 U.S.C. 154(b) by 468 days.

(21) Appl. No.: 10/327,927

(22) Filed: Dec. 26, 2002

(65) Prior Publication Data

US 2003/0124416 A1    Jul. 3, 2003

(30) Foreign Application Priority Data

Dec. 28, 2001   (JP)   ............................. 2001-401955

(51) Int. Cl.
   *H01M 2/04*   (2006.01)
(52) U.S. Cl. .................. 429/66; 429/162; 429/176
(58) Field of Classification Search ............... 429/66, 429/149, 162, 176
   See application file for complete search history.

(56) References Cited

U.S. PATENT DOCUMENTS

| | | | | |
|---|---|---|---|---|
| 3,607,425 A | * | 9/1971 | Titterington et al. ........... 429/9 |
| 4,467,020 A | * | 8/1984 | Puglisi ........................ 429/101 |
| 5,114,807 A | * | 5/1992 | Rowlette ..................... 429/152 |
| 6,746,797 B1 | * | 6/2004 | Benson et al. .............. 429/149 |
| 6,818,343 B1 | * | 11/2004 | Kimoto et al. ................ 429/99 |

FOREIGN PATENT DOCUMENTS

| | | |
|---|---|---|
| EP | 1 033 766 | 9/2000 |
| JP | 62-66557 | 3/1987 |
| JP | 7-230821 | 8/1995 |
| JP | 8-64234 | 3/1996 |
| JP | 11-176400 | 7/1999 |
| JP | 2000-195480 | 7/2000 |
| JP | 2001-167745 | 6/2001 |
| JP | 2001313012 | 11/2001 |

* cited by examiner

*Primary Examiner*—Gregg Cantelmo
(74) *Attorney, Agent, or Firm*—Young & Thompson

(57) ABSTRACT

A battery module includes a battery cell having a laminate overcoat, a pair of rubber sheets, a pair of pressure plates, and a pair of housing members from the internal to the external of the battery module. An intervention member including four poles is interposed between the pressure plate and the housing member at the central area of the battery cell to alleviate the stress concentration on the peripheral area of the battery cell. The intervention member may be formed separately from or integrated with the pressure plate.

18 Claims, 4 Drawing Sheets

BATTERY MODULE

BACKGROUND OF THE INVENTION (a) Field of the Invention

The present invention relates to a battery module and, more particularly, to the structure of a module battery including a flat secondary battery.

(b) Description of the Related Art

It is generally known that a secondary battery has a drawback in that the iterative charge and discharge operation causes generation of internal gas, which enters between electrodes of the battery cell to degrade the performance of the secondary battery. In particular, a secondary battery cell having a laminate overcoat suffers from a volume increase within the overcoat due to the internal gas to enlarge the gap between the electrodes of a battery body, thereby largely degrading the performance of the secondary battery.

For solving the above problem in a battery module including a battery cell having a laminate overcoat, an electrolytic solution having a function for suppressing the gas generation and/or a cell structure configured to suppress the increase of the electrode gap of the battery cell is generally employed. However, such an electrolytic solution does not in fact effectively prevent the volume increase due to the gas generation during the long lifetime of the secondary battery. In addition, the structure configured to suppress the increase of the electrode gap increases the weight per unit cell, thereby reducing the current storage capacity per unit weight of the secondary battery or a module including a plurality of such secondary batteries.

SUMMARY OF THE INVENTION

It is therefore an object of the present invention to provide a battery module including a plurality of flat secondary battery cells, which is capable of effectively suppressing the volume increase of the battery cell and has a smaller weight.

The present invention provides a battery module including a battery cell, a pair of pressure plates sandwiching therebetween the battery cell, a housing receiving therein the pair of pressure plates and the battery cell, said housing pressing the pressure plates toward each other, and an intervention member disposed between each of the pressure plates and a corresponding portion of the housing at a central area of the each of the pressure plates.

In accordance with the battery module of the present invention, provision of the intervention member between the pressure plate and the corresponding portion of the housing at the central area of the pressure plate allows reduction of the pressure applied onto the peripheral area of the battery cell, wherein the battery cell is applied with a substantially uniform pressure by the pressure plates even if the housing has a warp.

The above and other objects, features and advantages of the present invention will be more apparent from the following description, referring to the accompanying drawings.

PREFERRED EMBODIMENTS OF THE INVENTION

Before describing the embodiments of the present invention, the defects of the conventional techniques will be described for a better understanding of the present invention.

In general, a simple structure of the conventional box housing for the battery module may suppress the volume increase of the battery cell, by increasing the thickness of the box housing to raise the mechanical strength. However, this structure increases the weight of the battery module as a whole, thereby reducing the current storage capacity per unit weight of the battery module. On the other hand, a battery module having a smaller weight cannot suppress the volume increase of the battery cell due to the deformation such as warping, thereby allowing the volume increase and the degradation of the battery performance to proceed.

Figure 4:
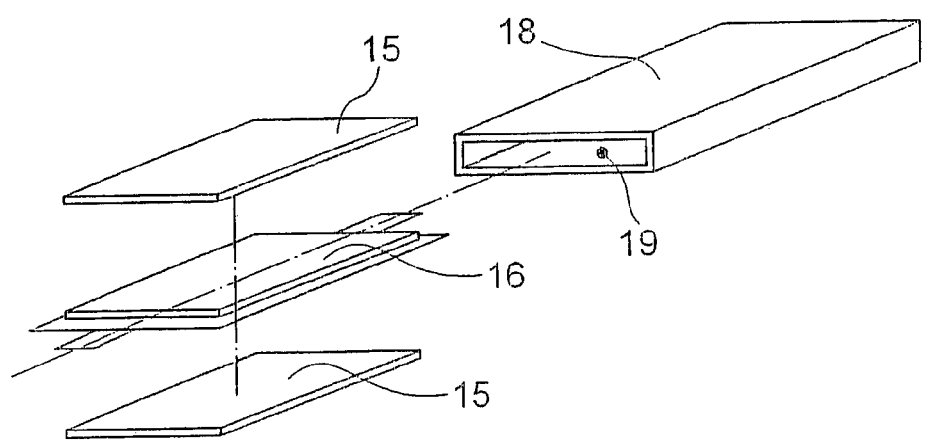
FIG. 4 is an exploded perspective view of a conventional battery module.

Referring to FIG. 4, a conventional battery module includes a flat secondary battery cell 16, a pair of elastic sheets 15, such as made of rubber, sandwiching therebetween the battery cell 16, and a rigid box housing 18 receiving therein the elastic sheets 15 and the flat battery cell 16. Filler material 19 is disposed in the gap between the elastic sheet 15 and the rigid housing 18. The battery cell 16 includes a laminate overcoat and a battery body received therein and having an iterative structure including a plurality of combinations each including a cathode, a first separator, an anode and a second separator. The rubber sheets 15 are omitted in some of the conventional battery modules.

In the conventional battery module as described above, if internal gas is generated due to the iterative charge and discharge operation of the battery, the internal gas causes a volume increase within the battery cell 16 against the external pressure by the elastic sheets 15 and the filler material 19. This volume increase causes degradation of the battery characteristics due to generation of the gap between the electrodes of the battery cell.

Figure 5:
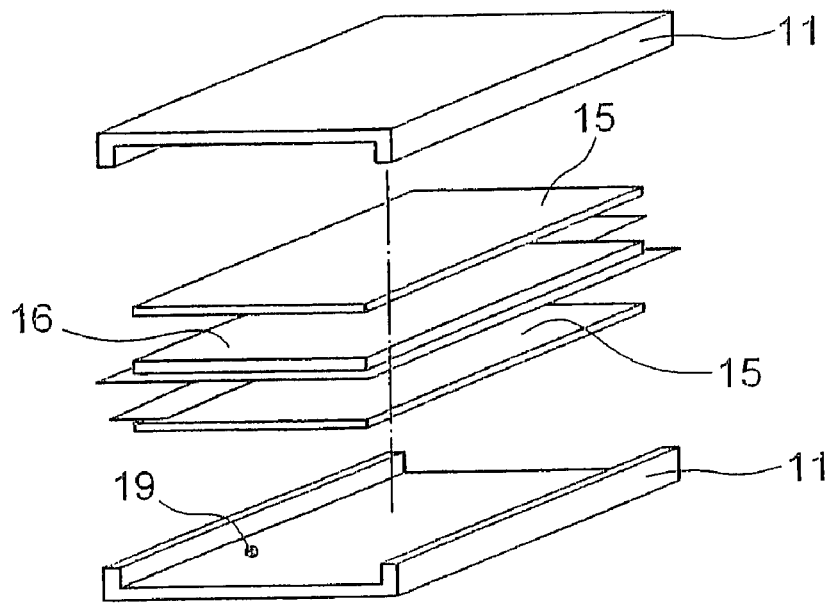
FIG. 5 is an exploded perspective view of another conventional battery module.

Referring to FIG. 5, another conventional battery module includes a battery cell 16, a pair of elastic sheets 15 sandwiching therebetween the battery cell 16, and a housing including a pair of housing members, or cover sheets, 11 sandwiching therebetween the elastic sheets 15, with an intervention of filler material 19. The pair of housing members 11 are coupled together by a mechanical force applied by screws and nuts (not shown) which press the pair of housing members 11 toward each other at the periphery thereof.

In the structure of the another conventional battery module shown in FIG. 5, the mechanical force applied by the screws and nuts at the periphery of the housing members 11 is applied to the battery cell 16 at the periphery thereof due to a warp of the housing members 11. Although the elastic sheets 15 may alleviate the concentration of the mechanical force on the peripheral area of the battery cell 16, the concentration of the mechanical force itself still remains to some extent. When the internal gas is generated due to the iterative charge and discharge operation of the battery cell 16, the housing members 11 are subjected to the volume increase wherein the central portion of the housing member 11 is raised with respect to the peripheral portion thereof, due to the mechanical force being applied to the peripheral portion by the screws and nuts. This causes a larger stress at the peripheral portion of the battery cell 16 and causes a larger gap between the electrodes of the battery body.

The large stress at the peripheral portion of the battery cell 16 may involve a damage of the edge of the separator, thereby generating a short circuit failure in the battery cell 16. The cause of the failure originates from the sandwiching structure of the housing, and may be prevented by using a rigid housing such as made of metallic plate or thick resin plate. However, in either case, the rigid housing causes an increase of the weight and cost and reduces the current storage capacity per unit weight of the battery module.

In view of the above, the battery cell 16 should be pressured with a suitable pressure for avoiding the volume increase caused by the iterative charge and discharge operation. In addition, in order to obtain such a suitable pressure by using the housing members 11, it is necessary to use the reactive force of the housing members 11 against the warp thereof without involving a stress concentration on the periphery of the battery cell 16. This necessitates a uniform pressure to be applied on the battery cell and should be achieved without using heavy metal plate or thick resin plate.

Figure 1:
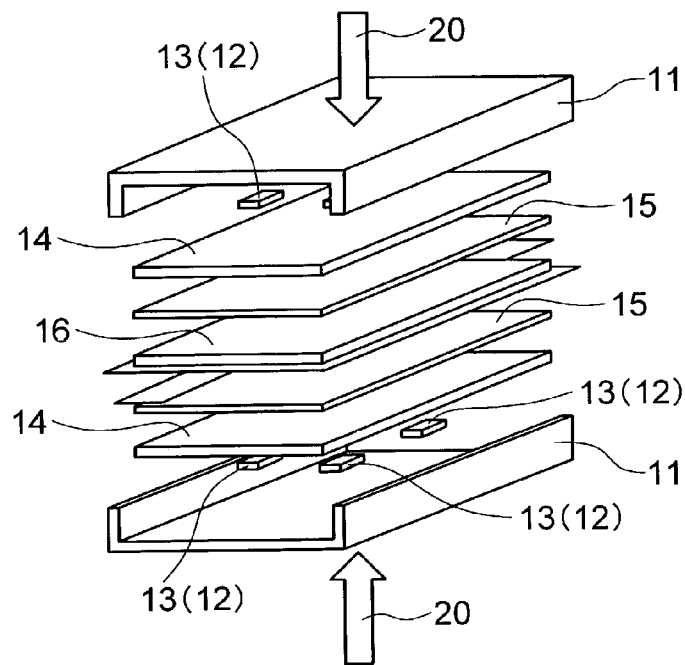
FIG. 1 is an exploded perspective view of a battery module according to a first embodiment of the present invention.

Now, the present invention will be described in more detail based on the preferred embodiments thereof with reference to the drawings. Referring to FIG. 1, a battery module according to a first embodiment of the present invention includes a battery cell 16 including a laminate overcoat and a battery body having an iterative structure such as described in the conventional battery module, a pair of rubber plates 15 sandwiching therebetween the battery cell 16, a pair of pressure plates 14 sandwiching therebetween the rubber plates 16 and battery cell 15, a pair of housing members 11 sandwiching therebetween the pressure plates 14, rubber plates 15 and battery cell 16, and an intervention member 12 interposed between each of the pressure plates 14 and a corresponding one of the housing members 11 at the central area of the pressure plates 14. The intervention member 12 in this embodiment includes four poles, or rectangular prisms 13 disposed at four apexes of a rectangle. The pair of housing members 11 are coupled together via bolts and nuts not shown at the periphery of the housing members 11.

The housing members 11, or top and bottom covers, have a function for applying a pressing force in the vertical direction, as viewed in FIG. 1, due to the warp thereof. The rectangular prisms 13 transfer the pressing force toward the pressure plate 14, the pressing force alleviating the concentration at the peripheral area of the pressure plates 14. The pressure plates 14 apply the pressing force to the battery cell 16 via the rubber sheets 15 having a function for alleviating the ununiformity of the pressing force, which may be caused by inaccuracy of fabrication of the battery cell 16. The number and the arrangement of the rectangular prisms 13 may be changed and selected so that the pressure plates 14 can press the battery cell 16 with a pressing force as uniform as possible between the central area and the peripheral area.

The structure of the battery module, which alleviates the concentration of the pressing force for the battery cell 16 at the peripheral area thereof, allows the material for the housing members 11 to be selected with a large design choice. That is, the housing members 11 may be made of a light material such as laminated films, and need not be made of a heavy metal plate or a thick resin plate.

The materials for the battery module of the present embodiment may be resin materials, metals or alloys, and should be selected in consideration of the external force, weight, volume and the performance of the battery module, such as storage capacity per unit weight. If a module having a higher rigidity or higher mechanical strength is desired, the module should be made of metals or alloys, which may somewhat increase the weight of the module. If a battery module having a smaller weight is desired, the battery module should be made of resin materials, which may reduce the rigidity or mechanical strength thereof to some extent compared to a module made of metals.

Samples of the embodiment were manufactured. The basic material for the samples of the battery module selected was stainless steel. The housing member 11 was 100 mm wide, 150 mm long and 3 mm thick, each of four rectangular prism 13 in the intervention member 12 was 10 mm wide, 20 mm long and 2 mm thick, the pressure plate 14 was 80 mm wide, 134 mm long and 3 mm thick, and the rubber sheet 15 was 70 mm wide, 124 mm long and 1.5 mm thick. The rubber sheet 15 was made of sponge of fluorine-based material having a higher modulus of elasticity. The battery cell 16 included a battery body impregnated with an non-aqueous electrolytic solution and having an iterative stacked structure of combinations each including a cathode, a first separator, an anode and a second separator, and a laminate overcoat receiving therein the battery body and made of laminated films. The battery cell was 90 mm wide, 140 mm long, and 4 mm thick, whereas the battery body was 70 mm wide, 124 mm long and 3.8 mm thick. The laminate overcoat was 100 μm thick.

Upon fabrication of the sample battery modules, the battery cell 16, rubber plates 15, pressure plates 14 and intervention members 13 were sandwiched between a pair of housing members 11, which were applied with external force and warped thereby. The positions of the rectangular prisms 13 in the intervention member 12 were adjusted so that the pressure plates 14 were applied with substantially uniform pressure. The uniformity of the applied pressure and the magnitude of the external force applied were measured by a pressure sensitive paper sandwiched between the rubber sheet 15 and the battery cell 16.

In the above samples, for the case of external forces of 40 kgf and 80 kgf applied, it was not observed that the battery body of the battery cell 16 was subjected to a stress concentration at the periphery of the battery cell 16. That is, the battery cell 16 was sandwiched between the rubber plates 15 substantially with a uniform pressure. This was observed in the case of a plurality (2 to 4, in this example) of battery cells 16 stacked one on another. The recited external forces 40 kgf and 80 kgf correspond to 0.5 kgf/cm$^2$ and 1.0 kgf/cm$^2$, respectively, in terms of the load per unit area of the battery cell.

The sample battery modules were subjected to charge and discharge cycle tests, wherein constant current contact voltage (CCCV) tests were conducted for 500 cycles between terminal voltages of 4.2 volts and 2.5 volts at an ambient temperature of 45 degrees C. The results of the CCCV tests are shown in Table 1, wherein the ratio (capacity remaining ratio (%)) of the current-storage capacity of the secondary battery after each specified number of charge and discharge cycles to the initial current-storage capacity is plotted against the each specified number of cycles, for each cases of external pressures of 0.5 kgf/cm$^2$ (sample 1) and 1.0 kgf/cm$^2$ (sample 2). For comparison with these samples, comparative examples corresponding to the conventional techniques shown in FIGS. 4 and 5 were also subjected to the CCCV tests.

The comparative example 1 shown in FIG. 4 had a 1-mm-thickness aluminum can housing 18 receiving therein a secondary battery 16, with urethane resin being disposed in the gap therebetween as a filler material 19. The comparative example 2 shown in FIG. 5 had a pair of 3-mm-thickness housing members, or top and bottom covers, 11 made of stainless steel, sandwiching therebetween a battery cell 16 via a pair of 1-mm-thickness sponge sheets 15 of a fluorine-based material. Both the comparative examples were subjected to an external pressure of around 80 kgf, whereby the external force was concentrated on the peripheral area of the battery body of the battery cell 16 due to the warp of the housing members 11.

As understood from Table 1, the battery modules of the samples of the first embodiment of the present invention have improved characteristics over the conventional battery modules. In particular, these samples had improved characteristics over the conventional battery module shown in FIG. 4 by about 10% after 500 cycles in terms of the capacity remaining ratio.

TABLE 1

| | Number of Cycles | | | | | |
|---|---|---|---|---|---|---|
| | 0 | 100 | 200 | 300 | 400 | 500 |
| Sample 1 | 100% | 86% | 80% | 78% | 75% | 74% |
| Sample 2 | 100% | 86% | 81% | 79% | 76% | 74% |
| Comp. Ex. 1 | 100% | 83% | 75% | 70% | 66% | 64% |
| Comp. Ex. 2 | 100% | 85% | 78% | 74% | 69% | 67% |

Sample 1: 0.5 kgf/cm$^2$, Sample 2: 1 kgf/cm$^2$

Figure 2:
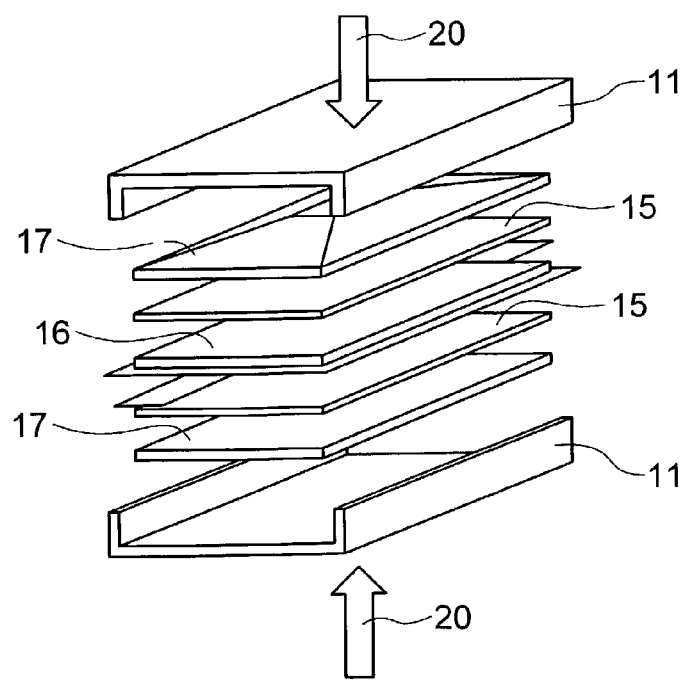
FIG. 2 is an exploded perspective view of a battery module according to a second embodiment of the present invention.

Referring to FIG. 2, a battery module according to a second embodiment of the present invention is similar to the first embodiment except for the materials for the battery module and the structure of the intervention member. More specifically, the basic material for the battery module of the present embodiment selected is glass epoxy resin including glass fiber for improving the mechanical strength of the ordinary epoxy resin. The intervention member 12 is integrated with the pressure plate to have a shape of part of pyramid.

Samples of the second embodiment were manufactured which were such that the housing member 11 was 100 mm wide, 150 mm long and 5 mm thick, the pressure plate 17 had a top surface which was 10 mm wide and 10 mm long, a bottom surface which was 80 mm wide and 130 mm long, and a maximum thickness of 3 mm, and the rubber plate 15 was 73 mm wide, 124 mm long and 1.5 mm thick. The rubber sheet 15 was made of sponge of fluorine-based material having a high modulus of elasticity. The flat battery cell 16 had a laminate housing and was similar to that used in the samples of the first embodiment.

External force 20 was applied to the housing members 11, and to the pressure plate 17 which was located at the center of the housing members 11. The thickness and the size of the top surface of the pressure plate 17 were designed so that a uniform pressure was applied to the battery cell 16. The uniformity of the pressure and the magnitude of the external pressure were measured with a pressure sensitive sheet sandwiched between the rubber sheet 15 and the battery cell 16.

Although the external force was changed between 8 kgf and 80 kgf, concentration of the applied force onto the peripheral area of the battery cell 16 was not observed and thus a uniform pressure was applied to the battery cell 16. This is observed in the case of a plurality (2 to 4, in this example) of the battery cells 16 stacked one on another. The external force thus applied corresponds to 0.1 kgf/cm$^2$ to 1.0 kgf/cm$^2$.

The cycle (CCCV) tests were conducted to the samples of the second embodiment for each case of pressures of 0.1 kgf/cm$^2$ (sample 3), 0.5 kgf/cm$^2$ (sample 4) and 1 kgf/cm$^2$ (sample 5) being applied to the battery cell 16. The conditions of the cycle tests were similar to the samples of the first embodiment. The results of the cycle tests are shown in table 2.

TABLE 2

| | Number of Cycles | | | | | |
|---|---|---|---|---|---|---|
| | 0 | 100 | 200 | 300 | 400 | 500 |
| Sample 3 | 100% | 85% | 80% | 78% | 75% | 72% |
| Sample 4 | 100% | 86% | 81% | 80% | 77% | 74% |
| Sample 5 | 100% | 85% | 71% | 80% | 76% | 74% |

Sample 3: 0.1 kgf/cm$^2$, Sample 4: 0.5 kgf/cm$^2$, Sample 5: 1 kgf/cm$^2$

As understood from tables 1 and 2, the samples of the battery module according to the second embodiment also achieved improvement in the capacity remaining ratio by around 10% at a maximum after 500 cycles compared to the conventional battery module. In particular, an applied pressure as low as 0.1 kgf/cm$^2$ can achieve an improvement of around 5% in the capacity remaining ratio.

Figure 3:
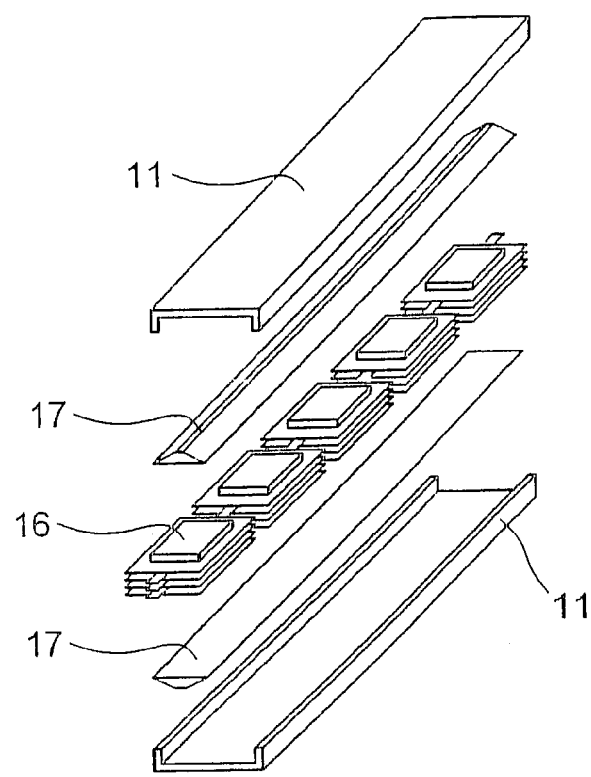
FIG. 3 is an exploded perspective view of a battery module according to a third embodiment of the present invention.

Referring to FIG. 3, a battery module according to a third embodiment of the present invention, including twenty battery cells 16 which are electrically connected in series and stacked up to four levels and arranged as a train including five battery stacks.

Figure 6:
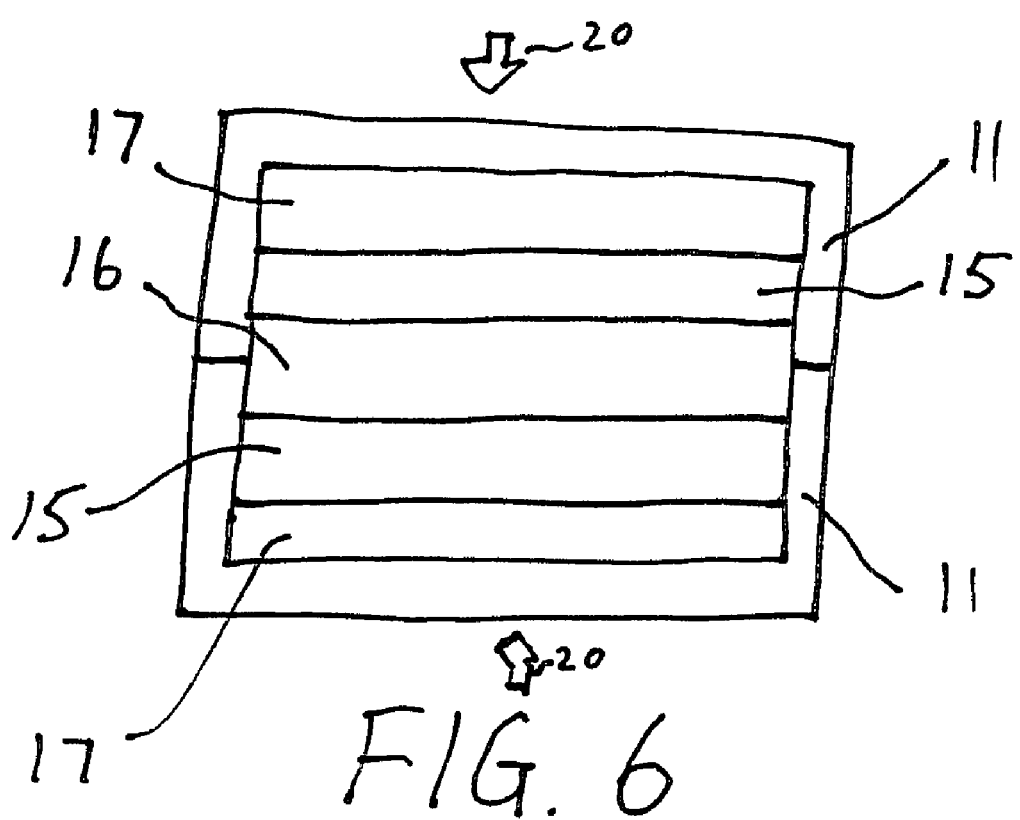
FIG. 6 is a front view of a battery module according to the present invention.

The battery cells 16 as a whole are sandwiched between a pair of pressure plates 17 having a part of pyramid shape, which are sandwiched between a pair of housing members 11. The external force 20 applied to the battery module causes battery module to wrap so that the pressure plates 17 and a corresponding portion of the housing 11 are contact with each other at a peripheral area as seen in FIG. 6. The battery module has excellent characteristics after the charge and discharge operation, and has a smaller weight due to the resin material used for the battery module.

Since the above embodiments are described only for examples, the present invention is not limited to the above embodiments and various modifications or alterations can be easily made therefrom by those skilled in the art without departing from the scope of the present invention.

What is claimed is:

1. A battery module comprising:
   a battery cell;
   a pair of pressure plates sandwiching therebetween said battery cell;
   a housing receiving therein said pair of pressure plates and said battery cell, said housing pressing said pressure plates toward each other for fixing said battery cell; and
   an intervention member disposed between each of said pressure plates and a corresponding portion of said housing at a central area of each of said pressure plates, wherein said battery cell includes a laminate housing and a battery body having an iterative structure of a plurality of cell units each including a cathode, a first separator, an anode and a second separator.

2. The battery module according to claim 1, wherein said intervention member includes a plurality of poles.

3. The battery module according to claim 2, wherein said poles are arranged at four apexes of a rectangle.

4. The battery module according to claim 1, wherein said intervention member is integrated with each of said pressure plates.

5. The battery module according to claim 4, wherein said pressure plates have a thickness larger at said central area than at a peripheral area.

6. The battery module according to claim 5, wherein each of said pressure plates and a corresponding portion of said housing are in contact with each other at said peripheral area when said housing is subject to said external pressure due to warp of said corresponding portion of said housing.

7. The battery module according to claim 1, wherein a plurality of said battery cell are disposed in a train between said pair of pressure plates.

8. The battery module according to claim 1, wherein a plurality of said battery cell are stacked one on another.

9. The battery module according to claim 1, wherein said housing includes a pair of housing members coupled together.

10. A battery module comprising:
a battery cell;
a pair of elastic plates sandwiching said battery cell therebetween;
a pair of pressure plates sandwiching therebetween said elastic plates and said battery cell;
a housing receiving therein said pair of elastic plates, said pair of pressure plates and said battery cell, said housing pressing said pressure plates toward each other so as to fix said battery cell in said housing; and
an intervention member between each of said pressure plates and only a corresponding central portion of said housing.

11. The battery module according to claim 10, wherein said intervention member includes a plurality of poles.

12. The battery module according to claim 11, wherein said poles are arranged at four apexes of a rectangle.

13. The battery module according to claim 10, wherein said intervention member is integrated with each of a respective one of said pressure plates.

14. The battery module according to claim 13, wherein said pressure plates have a thickness larger at a central area thereof than at a peripheral area thereof.

15. The battery module according to claim 14, wherein said pressure plates have a truncated pyramid shape.

16. The battery module according to claim 10, wherein plural ones of said battery cell are disposed in a train between said pair of pressure plates.

17. The battery module according to claim 10, wherein a plurality of said battery cell are stacked one on another.

18. The battery module according to claim 11, wherein said housing includes a pair of housing members coupled together.

* * * * *